United States Patent
Mishra

(10) Patent No.: US 10,355,957 B2
(45) Date of Patent: Jul. 16, 2019

(54) METHOD, SYSTEM AND APPARATUS FOR MONITORING ERROR CORRECTION DATA IN MEDIA SESSIONS

(71) Applicant: REDKNEE INC., Mississauga (CA)

(72) Inventor: Abhishek Mishra, Bangalore (IN)

(73) Assignee: REDKNEE INC., Mississauga (CA)

( * ) Notice: Subject to any disclaimer, the term of this patent is extended or adjusted under 35 U.S.C. 154(b) by 428 days.

(21) Appl. No.: 15/307,902

(22) PCT Filed: Jul. 22, 2014

(86) PCT No.: PCT/CA2014/000578
§ 371 (c)(1),
(2) Date: Oct. 31, 2016

(87) PCT Pub. No.: WO2016/011520
PCT Pub. Date: Jan. 28, 2016

(65) Prior Publication Data
US 2017/0054622 A1    Feb. 23, 2017

Related U.S. Application Data

(63) Continuation of application No. PCT/CA2014/000578, filed on Jul. 22, 2014.

(51) Int. Cl.
*H04L 12/26* (2006.01)
*H04L 1/00* (2006.01)
(Continued)

(52) U.S. Cl.
CPC .......... *H04L 43/0876* (2013.01); *H04L 1/003* (2013.01); *H04L 1/0045* (2013.01);
(Continued)

(58) Field of Classification Search
CPC . H04L 43/0876; H04L 43/0882; H04L 1/003; H04L 1/22; H04L 63/101; H04W 4/02
See application file for complete search history.

(56) References Cited

U.S. PATENT DOCUMENTS

| 6,421,387 B1 * | 7/2002 | Rhee ...................... H04B 1/66 375/240.12 |
| 7,002,076 B2 | 2/2006 | Ungerman et al. |

(Continued)

FOREIGN PATENT DOCUMENTS

| CA | 2614101 A1 | 2/2009 |
| EP | 2249514 A1 | 11/2010 |
| WO | 2011139305 A1 | 11/2011 |

OTHER PUBLICATIONS

3GPP: 3rd Generation Partnership Project; Technical Specification Group Core Network and Terminals; Policy control over Gq interface (Release 6), 3GPP TS 29.209 V6.8.0, Sep. 2011.
(Continued)

*Primary Examiner* — Joseph D Torres
(74) *Attorney, Agent, or Firm* — Perry+ Currier Inc.

(57) ABSTRACT

A method, system and apparatus for monitoring error correction data are provided. The method comprises receiving an authorization request defining a media session between an AF server and a mobile device from the AF server. The authorization request contains a media packet flow identifier and a corresponding forward error correction (FEC) packet flow identifier. The method includes deploying policy rules for the media session to a gateway server, the policy rules including the media packet flow identifier and the FEC packet flow identifier; receiving periodic reports from the gateway server, the reports including packet counts for each of the media packet flow and the FEC packet flow; determining whether bandwidth consumed by the FEC packet flow exceeds a predetermined threshold; and when the determination is affirmative, sending an action request to the AF server.

21 Claims, 5 Drawing Sheets

(51) Int. Cl.
*H04W 4/02* (2018.01)
*H04L 1/22* (2006.01)
*H04L 29/06* (2006.01)
*H04W 4/00* (2018.01)
*H04W 12/08* (2009.01)
*H03M 13/29* (2006.01)

(52) U.S. Cl.
CPC .............. *H04L 1/22* (2013.01); *H04L 43/062* (2013.01); *H04L 43/0882* (2013.01); *H04L 43/16* (2013.01); *H04L 65/80* (2013.01); *H04W 4/00* (2013.01); *H04W 4/02* (2013.01); *H04W 12/08* (2013.01); *H03M 13/2909* (2013.01); *H04L 1/004* (2013.01); *H04L 63/101* (2013.01)

(56) References Cited

U.S. PATENT DOCUMENTS

| | | | |
|---|---|---|---|
| 2005/0002416 A1* | 1/2005 | Belotserkovsky | H04L 1/0041 370/465 |
| 2006/0029065 A1* | 2/2006 | Fellman | H04L 1/004 370/389 |
| 2007/0298811 A1* | 12/2007 | Hartman | H04W 24/02 455/452.2 |
| 2008/0256409 A1* | 10/2008 | Oran | H04L 1/0009 714/748 |
| 2009/0092152 A1 | 4/2009 | Rajakarunanayake et al. | |
| 2010/0150003 A1 | 6/2010 | Andreasen et al. | |
| 2010/0246480 A1* | 9/2010 | Aggarwal | H04L 45/123 370/328 |
| 2015/0222555 A1* | 8/2015 | Rickeby | H04L 47/34 370/230 |

OTHER PUBLICATIONS

International Search Report dated Mar. 23, 2015 issued from the Canadian Intellectual Property Office relating to corresponding PCT International Application No. PCT/CA2014/000578.

Written Opinion of the International Searching Authority dated Mar. 23, 2015 issued from the Canadian Intellectual Property Office relating to corresponding PCT International Application No. PCT/CA2014/000578.

Extended European Search Report, dated Dec. 22, 2017, by EPO, re European Patent Application No. 14898139.2.

* cited by examiner

| Device ID | Threshold |
|-----------|-----------|
| 104 | 40% |
| ABC | 200Kbps |
| ... | ... |

Figure 4 under the rules set out in the present application.

METHOD, SYSTEM AND APPARATUS FOR MONITORING ERROR CORRECTION DATA IN MEDIA SESSIONS

FIELD

The specification relates generally to telecommunications networks, and specifically to a method, system and apparatus for monitoring error correction data in media sessions in such networks.

BACKGROUND

Increases in the computational capabilities of mobile devices such as cell phones, and in the bandwidth available to those devices from mobile networks, have lead to increased usage of packet-based media services such as voice calls, video streaming and the like. Such services are generally less tolerant of delays in packet transmission than services such as email. Thus, handling corrupted packets by requesting their re-transmission is sometimes impractical or impossible. In order to improve the reliability of such services, forward error correction (FEC) can therefore be employed. FEC involves including certain redundant data in the transmission to the mobile device, that allows the device to reconstruct at least some of the "regular" data (e.g. call audio, streaming video) in the event of corruption. In $3^{rd}$ Generation Partnership Project (3GPP) networks, examples of FEC mechanisms are found in specifications such as TS 26.946 V 11.1.0 (release 11) and TS 26.947 V1.0.0 (release 11).

Various FEC mechanisms impose varying levels of overhead of transmissions to the mobile devices. Such overhead can, in some cases, negatively impact the quality of the service being delivered to the mobile device.

BRIEF DESCRIPTIONS OF THE DRAWINGS

Embodiments are described with reference to the following figures, in which:

FIG. 4 depicts thresholds stored by the policy server of FIG. 2, according to a non-limiting embodiment.

DETAILED DESCRIPTION OF THE EMBODIMENTS

Figure 1:
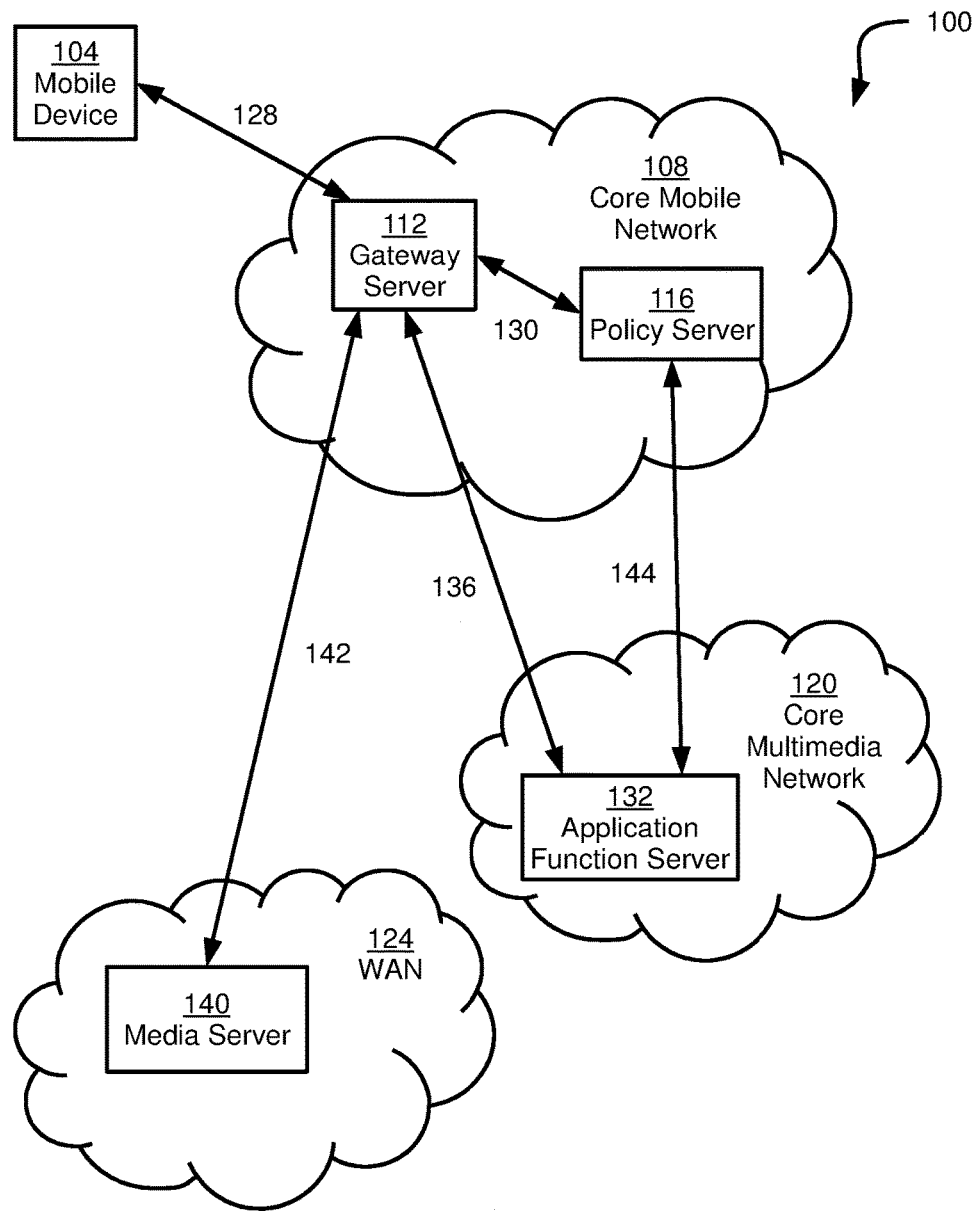
FIG. 1 depicts a communications system, according to a non-limiting embodiment.

FIG. 1 depicts a communications system 100. System 100 includes a mobile device 104, which can be any of a variety of mobile computing devices, and thus has hardware elements including a processing unit, volatile and non-volatile memory, network interfaces, input and output devices (e.g. displays, speakers, microphones, touch screens and the like). The processing unit of mobile device 104 executes programming instructions stored in memory for carrying out various functions, including the initiation of data communications over certain networks.

In the embodiments discussed herein, mobile device 104 is a cell phone or smart phone, able to connect to one or both of packet switched (e.g. Long Term Evolution (LTE)) and circuit switched (e.g. Global System for Mobile communications (GSM)) networks. Thus, mobile device 104 includes the necessary network interface hardware, and stored programming instructions, to communicate with a core mobile network 108. In the present example, core network 108 is structured according to the Long Term Evolution (LTE) standard set by the 3rd Generation Partnership Project (3GPP). The features described herein may also be applied to other networks, as will be apparent to those skilled in the art.

Core network 108 includes a gateway server 112 and a policy server 116. In the present example, in which core network 108 is the LTE core network, gateway server 112 may also be referred to as a Packet Data Network Gateway (PDN Gateway or P-GW), while policy server 116 may also be referred to as a Policy and Charging Rules Function (PCRF). Certain features of a P-GW and a PCRF in an LTE network will be known to those skilled in the art from published 3GPP specifications (e.g. 3GPP TS 23.203, 29.212. 29.213, and 29.214). However, policy server 116 includes additional features, described herein, that extend beyond those set out in the 3GPP specifications.

Other elements of core network 108 (such as a Mobility Management Entity, MME, and a Home Subscriber Server, HSS) can be implemented conventionally, and are therefore not shown herein for simplicity.

Gateway server 112, in brief, allows mobile device 104 (and other similar mobile devices, not shown) to access other data networks, including a core multimedia network 120 and a wide area network (WAN) 124. In the present example, core multimedia network 120 is an IP Multimedia Subsystem (IMS) network, and WAN 124 is the Internet. Mobile device 104 connects to gateway server 112 over a link 128. Link 128 traverses access network hardware such as base stations, which are not shown for simplicity of illustration. Having established communications with gateway server 112, mobile device 104 may communicate with other network elements that provide services to which mobile device 104 is subscribed.

Policy server 116 generates rules for communication sessions between mobile device 104 and gateway 112. The nature of such rules is not particularly limited: the rules can define Quality of Service (QoS) parameters for each session, charging parameters for each session, and other parameters that will occur to those skilled in the art. Policy server 116 provides those rules to gateway server 112 over a link 130, which can be based on any suitable protocol but in the present embodiment is based on the Gx protocol (which is itself an implementation of the Diameter protocol). Gateway server 112 applies the rules to its communication sessions with mobile device 104. The data carried in those communication sessions generally does not terminate at gateway server 112, but rather flows through gateway server 112 and terminates at a network element (or another mobile device) outside core network 108. The rules generated by policy server 116 can therefore be based not only on data stored within network 108, but also on data received from outside networks.

Through gateway server 112, as mentioned above, mobile device 104 can communicate with network elements referred to as Application Functions (AFs) in the 3GPP specifications (e.g. 3GPP TS 23.002). As seen in FIG. 1, an AF server 132 in core multimedia network 120 is connected to gateway server 112 via a link 136. For example, AF server 132 can be a call session and control server, such as a Proxy Call Session Control Server (P-CSCF) that participates in setting up incoming and outgoing media sessions for mobile device 104. Such media sessions can include voice over IP (VoIP or VoLTE) calls, real-time video streaming from a media server 140 in WAN 124 (connected to gateway server 112 via a link 142), and the like. As part of the establishment of such sessions, AF server 132 can send data to policy server 116 over a link 144 that includes an identifier of mobile device 104, an identifier of the service being requested (e.g. a VoIP call), the destination for the call, and the like. Policy server 116 is configured to generate rules for deployment to gateway server 112 based on the data received over link 144 in addition to data (such as data from a conventional Subscription Profile Repository (SPR), not shown) available within network 108.

AF server 132 can send the above-mentioned data to policy server 116 over link 144 using the Rx protocol (an implementation of the Diameter protocol). In some embodiments (not shown), AF server 132 may be a visiting AF server (that is, mobile device 104 may be roaming). In such embodiments, additional data may be received at policy server 116 from a home AF server, via a home policy server. Such data, as is known to those skilled in the art, can be received at policy server 116 using the S9 protocol. The conventional setup of media sessions for mobile device 104 through gateway 112 and AF server 132 (as well as any home network components if mobile device 104 is roaming) is well understood by those skilled in the art, as are the interactions between AF server 132 and policy server 116 during such call setup. However, certain enhancements to AF server 132 and the Rx protocol used over link 144 are contemplated that extend beyond conventional session setup, and will therefore be described herein.

When mobile device 104 participates in a media session, such as receiving streaming video from media server 140, the streaming video is sent along with forward error correction (FEC) data. FEC data imposes a certain level of overhead on the media session, but allows mobile device 104 to reconstruct certain corrupted packets of the video stream without needing to request that those packets be re-sent by media server 140. In some cases, however, the overhead imposed by the FEC data may become detrimental to the media session or to other operations being carried out by mobile device 104.

Therefore, system 100 in general, and policy server 116 in particular, is configured to monitor the level of bandwidth being consumed by FEC data during a media session, and to take various actions based on that monitoring. Before discussing the operations performed by policy server 116 and other elements of system 100 to accomplish such monitoring, a more detailed discussion of policy server 116 will be provided.

Figure 2:
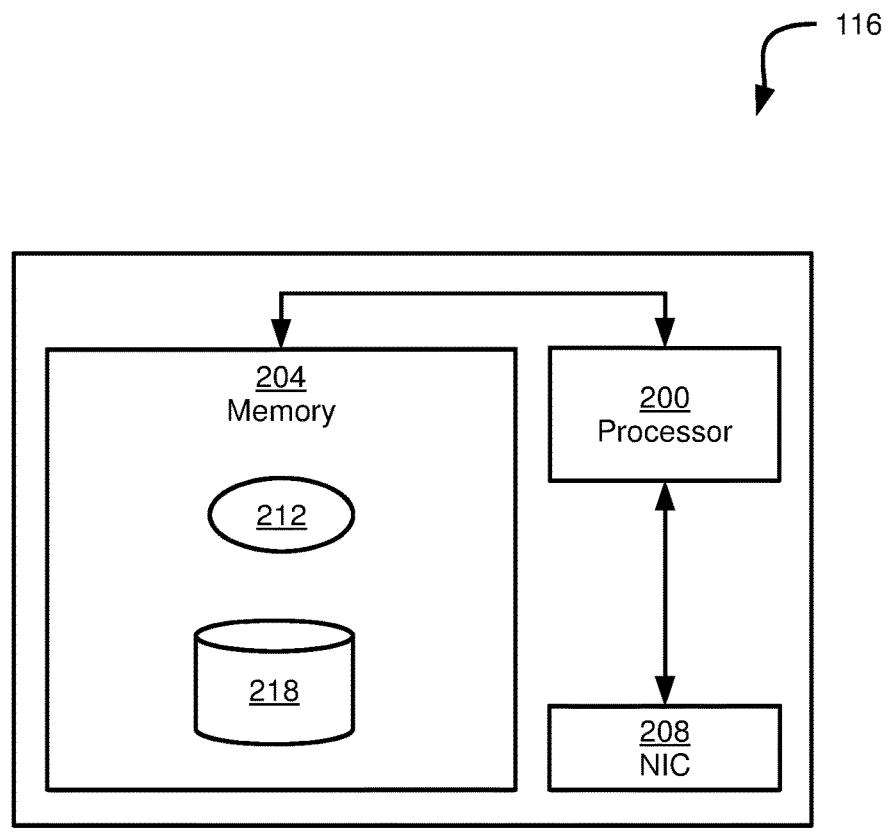
FIG. 2 depicts certain internal components of the policy server of FIG. 1, according to a non-limiting embodiment.

Turning to FIG. 2, certain internal components of policy server 116 are depicted. Policy server 116 includes a central processing unit (CPU) 200, also referred to herein as a processor 200, interconnected with a memory 204. Processor 200 and memory 204 are generally comprised of one or more integrated circuits (ICs), and can have a variety of structures, as will now occur to those skilled in the art (for example, more than one CPU can be provided).

Memory 204 can be any suitable combination of volatile (e.g. Random Access Memory ("RAM")) and non-volatile (e.g. read only memory ("ROM"), Electrically Erasable Programmable Read Only Memory ("EEPROM"), flash memory, magnetic computer storage device, or optical disc) memory. In the present example, memory 204 includes both volatile and non-volatile storage.

Processor 200 is also interconnected with one or more network interfaces, such as a network interface controller (NIC) 208, which allows policy server 116 to connect to other computing devices in networks 108, 120 and 124 (e.g. via links 130 and 144). NIC 208 thus includes the necessary hardware to communicate over links 130 and 144, as well as any other links required by policy server 116. Policy server 116 can also include input devices (not shown) interconnected with processor 200, such as a keyboard and mouse, as well as output devices (not shown) interconnected with processor 200, such as a display. In some embodiments, the input and output devices can be connected to processor 200 via NIC 208 and another computing device. In other words, input and output devices can be local to policy server 116, or remote.

Memory 204 stores a plurality of computer-readable programming instructions, executable by processor 200, in the form of various applications, and also stores various types of data for use during the execution of those applications. As will be understood by those skilled in the art, processor 200 may execute the instructions of one or more such applications in order to perform various operations defined within the instructions. In the description below, processor 200 or policy server 116 more generally are said to be "configured to" perform certain functions. It will be understood that policy server 116 is so configured via the processing of the instructions of the applications stored in memory 204.

Among the applications stored in memory 204 is a policy application 212. In addition, memory 204 contains a policy database 218. Policy database 218, as will now be apparent to those skilled in the art, contains various parameters for controlling media sessions. For example, policy database 218 can contain a policy corresponding to mobile device 104, specifying the bandwidth available to mobile device 104 for different types of service (e.g. VoIP call and streaming video), the times of day mobile device 104 is permitted to access such services, which AF servers 132 mobile device 104 is permitted to interact with, and the like. Policy database 218 can also contain a policy corresponding to AF server 132 itself.

Figure 3:
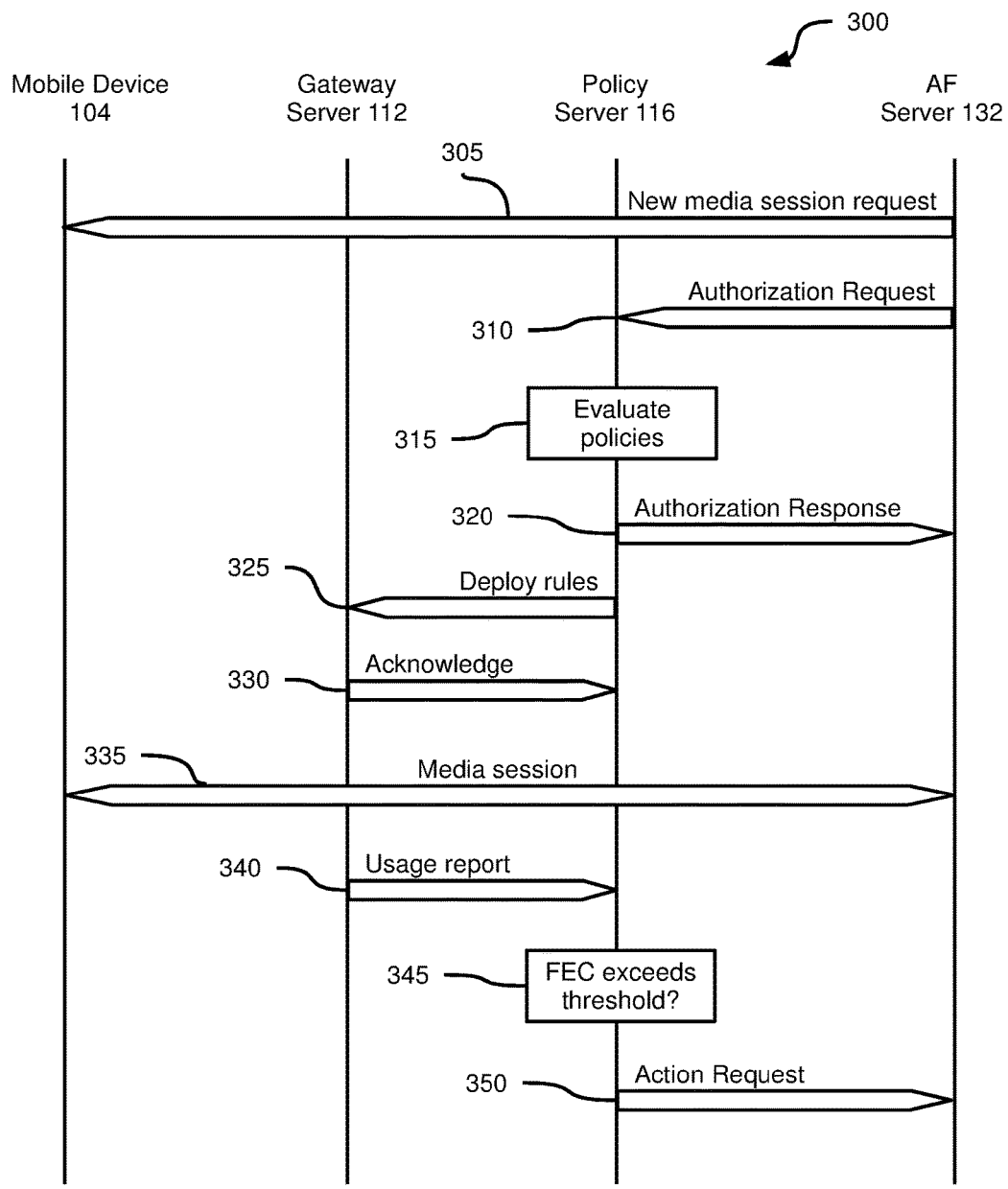
FIG. 3 depicts a method of monitoring error correction data, according to a non-limiting embodiment.

Through the execution of policy application 212 and the use of policy database 218 during such execution, policy server 116 is configured to deploy rules to gateway server 112 for media sessions involving mobile device 104, and to monitor the volume of FEC data transmitted during those sessions. Turning now to FIG. 3, an example of the operations performed by policy server 116 and other components of system 100 will be discussed.

FIG. 3 depicts a method 300 of monitoring error correction data. Method 300 will be discussed in conjunction with its performance in system 100, although it will be appreciated that method 300 may also be performed on variations of system 100.

It is assumed that, prior to the performance of method 300, connections have been established between mobile device 104 and gateway 112, and between mobile device 104 and AF server 132. In other words, it is assumed that mobile device 104 is registered with networks 108 and 120 according to conventional mechanisms.

At block 305, AF server 132 transmits a new media session request to mobile device 104 via gateway server 112. The nature of the media session request is not particularly limited. For example, the request may be an incoming VoIP call terminating at mobile device 104. In other examples, the request may be the beginning of a streaming video session initiated by mobile device 104 itself in an earlier request (not shown). The contents of the request transmitted by AF server 132 at block 305 includes parameters defining the media session. For example, such parameters can be formulated according to the Session Definition Protocol (SDP). An example of the message sent and block 305 is shown below:

TABLE 1

Example Session Request c=IN IP4 224.2.17.12/127
    a=group:FEC 1 2
m=audio 30000 RTP/AVP 0
    a=mid:1
m=application 30002 RTP/AVP 100
    a=rtpmap:100 ulpfec/8000
    a=mid:2

The contents of the above example of a session request will be familiar to those skilled in the art. In particular, the message includes a connection field "c" defining a network type (Internet, or IN), a network protocol (Internet Protocol version 4, or IP4) and a connection address (224.2.17.12/127). The message also includes media description fields "m" for two media flows. Each media description includes a type of media (e.g. "audio"), a port to be used by that media flow (e.g. 30000), and a transport protocol and format (e.g. "RTP/AVP 0"). As will be apparent from the example message above, two media flows are defined—a first media flow for carrying the content of the media session (e.g. the audio of the voice call) and a second media flow for carrying FEC data.

At block 310, AF server 132 is configured to send an authorization request (also referred to as an Authentication and Authorization Request, or AAR) to policy server 116 over link 136. The authorization request includes separate flow definitions for the media and the FEC data, taken from the message send by AF server 132 at block 305. The authorization request sent at block 310 can also include an identifier of the FEC algorithm to be used in the media session (that is, the algorithm that the original sender of the media will use to generate the FEC packet flow from the media). The FEC algorithm identifier can be received at AF server 132 from the originator of the media to be sent (e.g. media server 140). A wide variety of FEC algorithms will occur to those skilled in the art, and any suitable FEC algorithm may be employed by the sender. Policy server 116 is configured to store the received FEC algorithm identifier in memory 204. An example of the authorization request sent at block 310 is shown below:

TABLE 2

Example Authorization Request

Media-Component-Description1
    Media-Subcomponent-Description
        Flow-Description(Regular)
Media-Component-Description2
    Media-Subcomponent-Description
        Flow-Description(FEC)
        FEC-Algorithm(ULP)

As seen above, the authorization request contains "media component descriptions" for a media packet flow and an FEC packet flow. Each description includes a packet flow identifier (e.g. "Regular" and "FEC"), and the FEC packet flow description can also include an identifier of the FEC algorithm to be used (e.g. ULP, or Uneven Level Protection).

At block 315, policy server 116 is configured to retrieve policies from policy database 218 corresponding to mobile device 104 and AF server 132 and to evaluate those policies to determine whether to permit the media session to be established using the parameters requested by AF server 132. The performance of block 315 is implemented conventionally, and is therefore not described in detail herein. For example, the policy evaluations can include verifying that mobile device 104 is permitted to establish a media session of the type indicated in the request from block 310.

If the policies do not permit the media session, then policy server 116 can be configured to end the performance of method 300, or to return a message to AF server 132 with altered session parameters that would be acceptable. Assuming that policy server 116 determines at block 315 that the request from block 310 complies with the policies in policy database 218 that correspond to mobile device 104 and AF server 132, performance of method 300 proceeds to block 320.

At block 320, policy server 116 is configured to send an authorization response (also referred to as an Authentication and Authorization Answer, or AA-A) to AF server 132 confirming receipt of the authorization request received at block 310 and confirming that the media session is permitted.

At block 325, policy server 116 is configured to deploy rules for the media session to gateway server 112. For example, the rules may be deployed by way of a Re-Authorization Request (RAR) sent from policy server 116 to gateway server 112. The message sent at block 325 configures the connection between gateway server 112 and mobile device 104 (which, as mentioned above, was established prior to the beginning of the performance of method 300) to support the media session. The rules sent to gateway server 112 at block 325 include the media packet flow identifier and the FEC packet flow identifier mentioned above (e.g. "Regular" and "FEC"), as well as, for example, QoS parameters for each of the two packet flows. In addition, the rules sent to gateway server 112 at block 325 can include a reporting rule containing a predefined interval at which gateway server 112 is to report usage data for each packet flow. The rules can also specify which usage data is to be reported for each reporting period (e.g. packets sent, corrupted packets, repeated packets and the like).

At block 330, gateway server 112 is configured to acknowledge receipt of the rules deployed by policy server 116, and to implement those rules for the connection between gateway server 112 and mobile device 104.

At block 335, the establishment of the media session is completed following conventional techniques that will be apparent to those skilled in the art. Thus, following the performance of block 335, a media session is established between mobile device 104 and AF server 132 (and, depending on the nature of the session, another device such as media server 140). Thus, data packets containing both media (e.g. streaming video) and FEC data flow between AF server 132 and mobile device 104. Gateway server 112 is configured to monitor the packet flows and enforce the rules received from policy server 116 at block 325. For example, gateway server 112 can implement packet filters for each flow. Thus, gateway server 112 can implement a first packet filter for the "regular" packet flow carrying the media data itself, and a second packet filter for the FEC packet flow carrying the FEC data.

The nature of the packet filters implemented at gateway server 112 is not particularly limited. In the present example, each packet filter can include any suitable combination of the following pairs of attributes and values: (1) an action attribute, with a value selected from "permit" and "deny" or similar terms; (2) a direction attribute, with a value selected from "outward" and "inward" or similar terms; (3) a protocol attribute, with a value identifying the protocol used by the relevant packet flow (e.g. "IP"); (4) a source network address attribute containing a network address (such as an IP address) of the sender of the packets; and (5) a destination network address attribute containing a network address (such as an IP address) of the receiver of the packets.

At block 340, gateway server 112 is configured to send periodic reports (with a period equal to that specified in the above-mentioned reporting rule) to policy server 116 for each packet flow that gateway server 112 is monitoring. Such reports can be formatted as credit control requests (CCRs) that are familiar to those skilled in the art. Thus, in the present example, gateway server 112 is configured, for each successive period of time, to report usage data from that period of time for each packet flow. An example reporting message sent at block 340 is provided below:

TABLE 3

Example Usage Data Report

Event-Trigger = "Report-Flow-Usage"
Flow-Label = "Regular"
   Packets-Received = p1
   Packets-Corrupted = c1
   Packets-Repeated = r1
Flow-Label = "FEC"
   Packets-Received = p2
   Packets-Corrupted = c2
   Packets-Repeated = r2

As seen above, counts of total packets received, corrupted packets received, and packets repeated in connection with each of the regular and FEC packet flows are included in the message sent to policy server 116 at block 340. The counts can be for the preceding period of time specified in the rules deployed by policy server 116. For example, if the reporting period is ten seconds, a message can be sent at block 340 every ten seconds, and each message includes reporting data for the ten-second period immediately preceding its creation.

Having received the reporting data, at block 345 policy server 116 is configured to determine whether bandwidth consumed by the FEC packet flow has exceeded a predefined threshold. The predefined threshold can be stored in memory 204, and can be represented as a percentage of total bandwidth available to mobile device 104 or as an absolute threshold. Thresholds can be store within policy database 218 or in a separate database (not shown) in memory 204. Referring to FIG. 4, an example of thresholds stored in memory 204 is shown. Thus, for mobile device 104, policy server 116 is configured to determine the total bandwidth available to mobile device 104 (which may be stored elsewhere in database 218) and compute a percentage of that total bandwidth to obtain the threshold. Meanwhile, for a different mobile device (labelled "ABC"), policy server 116 may be configured instead to simply enforce a threshold of five hundred kilobits per second for FEC data, regardless of the total bandwidth available to that mobile device.

Although FIG. 4 shows device-specific thresholds, policy server 116 can also implement a universal threshold instead of (or in addition to) device-specific thresholds. In addition, the threshold need not be static. In some embodiments, policy server 116 can be configured to adapt the threshold. For example, policy server 116 can be configured to update a threshold upon receiving an indication that the available bandwidth to a particular device has increased (for example, through a service contract upgrade).

Returning to FIG. 3, the determination at block 345 can take a variety of forms. In general, policy server 116 is configured to generate a bandwidth value, representing a volume of data per unit of time, based on one or both of the reporting data received from gateway server 112 at block 340 and the FEC algorithm received from AF server 132 at block 310. For example, in some embodiments, policy server 116 is configured to store identifiers of FEC algorithms and the corresponding known overheads of those algorithms. Thus, at block 345 policy server 116 can be configured to look up the known overhead (e.g. 20%) for the FEC algorithm matching the identifier received from AF server 132 at block 310.

In other embodiments, at block 345 policy server 116 can be configured to assess the effect of the FEC algorithm received at block 310 on packets that must be retransmitted (that is, packets that could not be reconstructed at mobile device 104 by use of the FEC data). A brief example of such a determination at block 345 will now be discussed.

In some cases, retransmitted packets may be sent using the same FEC algorithm as the original data stream. Further, in some cases the retransmitted packets may interspersed among subsequent "original" packets. Policy server 116 can therefore be configured to determine the effect of such retransmitted packets on overall bandwidth usage. In the following example, the FEC algorithm to be considered is described in detail in the Pro-MPEG Code of Practice #2 release 2 publication entitled "Transmission of Professional MPEG-2 Transport Streams over IP Networks" and made available by the Pro-MPEG Forum at www.pro-mpeg.org/documents/wancop3.pdf, the contents of which is incorporated herein by reference.

Figure 5:
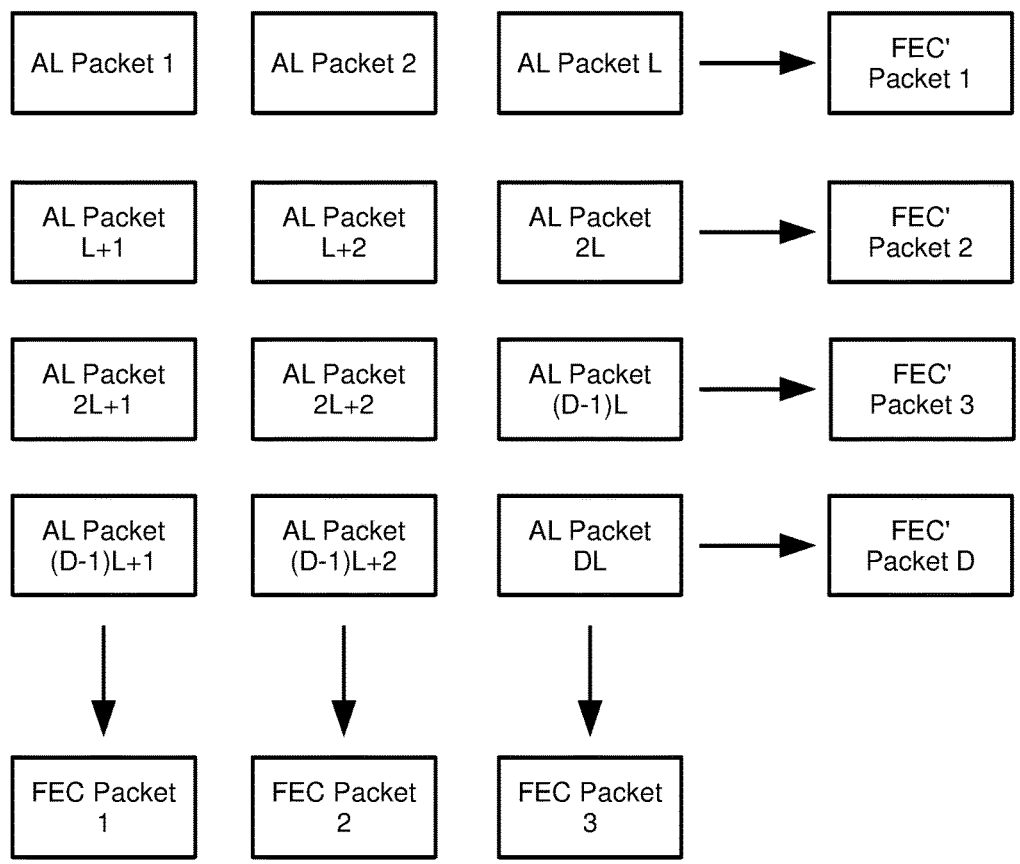
FIG. 5 depicts an example forward error correction algorithm for use in the system of FIG. 1.

In brief, an FEC algorithm is described in which application layer packets (that is, packets of the first media flow) are arranged in a two-dimensional matrix as shown in FIG. 5, having dimensions L×D (in FIG. 5, L is three and D is four, although a wide variety of other values may be used). For each row and each column of the matrix, one FEC packet is generated by performing an XOR operation on the packets of that column or row. Thus, various patterns of packet loss can be reconstructed, including up to L consecutive packet losses. In this example, two separate FEC streams would be generated (FEC and FEC'), although in other examples, only a single stream of FEC packets may be generated, for example by omitting the generation of FEC packets from the rows shown in FIG. 5.

In media sessions using the above FEC algorithm, lost packets that cannot be reconstructed may be sent in line with subsequent packets of the first media flow. That is, for each L×D matrix some of the packets in the matrix may be original packets while others may be retransmitted packets. In cases where the media content delivered to mobile device 104 is being displayed substantially in real time at mobile device 104, there may be a protection window, for example of two seconds, in which retransmissions may be effected before the retransmitted packets are actually displayed on mobile device 104. Any retransmitted packets received after the protection window has expired (that is, more than two seconds after the original packet was supposed to have been displayed by mobile device 104) will be too late.

Therefore, the need to retransmit packets imposes an increased throughput requirement on the media session, in order to retransmit packets in time for them to be displayed by mobile device 104. Policy server 116 is configured to determine the increased throughput based on the FEC algorithm received at block 310 and the usage data received at block 340. For example, consider the following video clip being delivered to mobile device 104:

TABLE 4

Example Media

| | |
|---|---|
| Length of video | 30 seconds |
| Frames per second | 24 |
| Total video frames (1 frame carried per packet) | 720 |
| Data in each packet | 900 bytes |
| Overhead data per packet (e.g. IP headers) | 78 bytes |
| Total packet size | 978 bytes |

In the present example performance of method 300, it is assumed that the above video is to be streamed to mobile device 104 using the FEC algorithm of FIG. 5 in the 3×4 arrangement illustrated. In order to transmit the entire video clip without retransmissions, therefore, a total of 720 packets in the first media flow (that is "content" packets") are required. According to the FEC algorithm of FIG. 5, those 720 packets are arranged in sixty matrices, with each matrix leading to the generation of seven FEC packets, for a total of 420 FEC packets, which are assumed to also have a total size of 978 bytes each. Thus, the total volume of data required to deliver the video clip to mobile device 104, before any retransmissions are considered, is (720 packets× 978 bytes/packet)=687.7 KB. Over the course of 30 seconds, the bandwidth required by the above media session is therefore 22.9 KBps, or 183 Kbps.

If, at block 340, policy server 116 receives a message indicating that nine packets must be retransmitted, those nine packets may be interspersed within subsequent original packets. For example, the retransmitted packets may be distributed among subsequent matrices at a rate of three retransmitted packets per matrix. Thus, it will require the next three matrices to complete the retransmission, representing a total of thirty-six content packets and twenty-one FEC packets, with a total size of 54.4 KB. In order to avoid receiving any of the retransmitted packets outside the protection window (which is two seconds, in the present example), that volume of 54.4 KB must be received within two seconds, which imposes a total throughput on the system of 27.2 KBps, or 217.8 Kbps during those two seconds. Referring briefly to FIG. 4, in which the device "ABC" has a threshold of 200 Kbps, it will now be apparent that policy server 116 may arrive at an affirmative determination at block 345 in the above example. The above principles may also be applied to a wide variety of other FEC algorithms and associated retransmissions.

If the determination at block 345 is negative—that is, if the bandwidth being consumed by FEC data (and possibly retransmissions, as discussed above) in the media stream established at block 335 does not exceed the threshold—policy server 116 awaits the next report from gateway server 112. In other words, policy server 116 does not perform block 350.

If the determination at block 345 is affirmative, however—that is, if the bandwidth being consumed by FEC data in the media stream established at block 335 does exceed the threshold—policy server 116 is configured to perform block 350.

At block 350, policy server 116 is configured to send an action request to AF server 132 in response to determining that the bandwidth consumed by the FEC packet flow has exceeded the threshold. The contents of the action request are not particularly limited. In general, the action request message sent by policy server 116 at block 350 includes an identifier of the media session, and an indication that the FEC threshold has been exceeded. An example of the message sent by policy server 116 at block 350 is shown below:

Session-ID = "session_104"
Specific-Action = "FEC-QoS-Absorbed"
Qos-Report

As seen above, the message sent at block 350 includes a session identifier of the media session established at block 335, as well as a "specific action" parameter containing a value "FEC-QoS-Absorbed". A wide variety of terminology may be used for the specific attribute parameter and its value, its general contents being an indication to AF server 132 that the FEC stream being provided by AF server 132 (or media server 140, for example) to mobile device 104 has exceeded a bandwidth threshold.

In response to receiving the action request, AF server 132 can take a variety of actions. For example, AF server 132 can modify billing rules for the media session so as to bill only for original media packets, or only for original packets and a portion of FEC packets (rather than all FEC packets). AF server 132 can automatically select a different FEC algorithm or select an alternate path for transmission of the media session. As a further example, AF server 132 can instruct the originator of the media data (such as media server 140) to switch FEC algorithms. The action request itself can specify the particular action to be taken by AF server 132.

Variations to the above embodiments are contemplated. For example, in addition to the action request sent at block 350, policy server 116 can also be configured to send billing data to another network element either during the media session or upon conclusion of the media session, as is familiar to those skilled in the art. Policy server 116 can additionally be configured to send usage data to such a network element that excludes FEC data, such that mobile device 104 is not billed for FEC data, but rather is only billed for "regular" media data.

Persons skilled in the art will appreciate that there are yet more alternative implementations and modifications possible for implementing the embodiments, and that the above implementations and examples are only illustrations of one or more embodiments. The scope, therefore, is only to be limited by the claims appended hereto.

I claim:

1. A method in a policy server having a processor, a memory and a network interface connected to a gateway server and an application function (AF) server, the method comprising:
  receiving an authorization request defining a media session between the AF server and a mobile device at the processor from the AF server via the network interface; the authorization request containing a media packet flow identifier and a corresponding forward error correction (FEC) packet flow identifier;
  deploying policy rules for the media session from the processor to the gateway server via the network interface, the policy rules including the media packet flow identifier and the FEC packet flow identifier;
  receiving periodic reports at the processor from the gateway via the network interface, the reports including packet counts for each of the media packet flow and the FEC packet flow;

determining, at the processor, whether bandwidth consumed by the FEC packet flow exceeds a predetermined threshold; and when the determination is affirmative, sending an action request to the AF server via the network interface.

2. The method of claim 1, further comprising: prior to deploying the policy rules, retrieving a policy corresponding to the mobile device from the memory, and evaluating the policy to determine whether the media session is permitted.

3. The method of claim 1, the policy rules including a reporting period specifying the period of time between the periodic reports.

4. The method of claim 1, wherein the determining includes:
generating a bandwidth value based on the periodic reports and the period of time elapsed between the periodic reports; and
comparing the bandwidth value to the threshold.

5. The method of claim 1, wherein the authorization request includes an FEC algorithm identifier.

6. The method of claim 5, wherein the determining includes:
retrieving an overhead value corresponding to the FEC algorithm identifier from the memory;
generating a bandwidth value based on the overhead value and the periodic reports; and
comparing the bandwidth value to the threshold.

7. The method of claim 1, the action request containing an indication that the FEC packet flow has exceeded the threshold.

8. A policy server, comprising:
a memory;
a network interface connected to a gateway server and an application function (AF) server; and
a processor interconnected with the memory and the network interface, the processor configured to:
receive an authorization request defining a media session between the AF server and a mobile device from the AF server via the network interface; the authorization request containing a media packet flow identifier and a corresponding forward error correction (FEC) packet flow identifier;
deploy policy rules for the media session to the gateway server via the network interface, the policy rules including the media packet flow identifier and the FEC packet flow identifier;
receive periodic reports from the gateway via the network interface, the reports including packet counts for each of the media packet flow and the FEC packet flow;
determine whether bandwidth consumed by the FEC packet flow exceeds a predetermined threshold; and
when the determination is affirmative, send an action request to the AF server via the network interface.

9. The policy server of claim 8, further comprising: prior to deploying the policy rules, retrieving a policy corresponding to the mobile device from the memory, and evaluating the policy to determine whether the media session is permitted.

10. The policy server of claim 8, the policy rules including a reporting period specifying the period of time between the periodic reports.

11. The policy server of claim 8, the processor further configured to determine whether bandwidth consumed by the FEC packet flow exceeds a predetermined threshold by:

generating a bandwidth value based on the periodic reports and the period of time elapsed between the periodic reports; and
comparing the bandwidth value to the threshold.

12. The policy server of claim 8, wherein the authorization request includes an FEC algorithm identifier.

13. The policy server of claim 12, the processor further configured to determine whether bandwidth consumed by the FEC packet flow exceeds a predetermined threshold by:
retrieving an overhead value corresponding to the FEC algorithm identifier from the memory;
generating a bandwidth value based on the overhead value and the periodic reports; and
comparing the bandwidth value to the threshold.

14. The policy server of claim 8, the action request containing an indication that the FEC packet flow has exceeded the threshold.

15. A non-transitory computer readable medium storing a plurality of computer-readable instructions executable by a processor of a policy server having a memory and a network interface interconnected with the processor, for implementing a method comprising:
receiving an authorization request defining a media session between the AF server and a mobile device at the processor from the AF server via the network interface; the authorization request containing a media packet flow identifier and a corresponding forward error correction (FEC) packet flow identifier;
deploying policy rules for the media session from the processor to the gateway server via the network interface, the policy rules including the media packet flow identifier and the FEC packet flow identifier;
receiving periodic reports at the processor from the gateway via the network interface, the reports including packet counts for each of the media packet flow and the FEC packet flow;
determining, at the processor, whether bandwidth consumed by the FEC packet flow exceeds a predetermined threshold; and
when the determination is affirmative, sending an action request to the AF server via the network interface.

16. The non-transitory computer readable medium of claim 15, the method further comprising: prior to deploying the policy rules, retrieving a policy corresponding to the mobile device from the memory, and evaluating the policy to determine whether the media session is permitted.

17. The non-transitory computer readable medium of claim 15, the policy rules including a reporting period specifying the period of time between the periodic reports.

18. The non-transitory computer readable medium of claim 15, wherein the determining includes:
generating a bandwidth value based on the periodic reports and the period of time elapsed between the periodic reports; and
comparing the bandwidth value to the threshold.

19. The non-transitory computer readable medium of claim 15, wherein the authorization request includes an FEC algorithm identifier.

20. The non-transitory computer readable medium of claim 19, wherein the determining includes:
retrieving an overhead value corresponding to the FEC algorithm identifier from the memory;
generating a bandwidth value based on the overhead value and the periodic reports; and
comparing the bandwidth value to the threshold.

21. The non-transitory computer readable medium of claim 15, the action request containing an indication that the FEC packet flow has exceeded the threshold.

\* \* \* \* \*